(12) United States Patent
Wentland et al.

(10) Patent No.: US 10,862,378 B2
(45) Date of Patent: Dec. 8, 2020

(54) ADDITIVE AMORTISSEUR CIRCUIT

(71) Applicant: HAMILTON SUNDSTRAND CORPORATION, Charlotte, NC (US)

(72) Inventors: William Louis Wentland, Rockford, IL (US); Eric W. Karlen, Rockford, IL (US); Dhaval Patel, Loves Park, IL (US); Andrew R. Wilkinson, Cherry Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/783,502

(22) Filed: Feb. 6, 2020

(65) Prior Publication Data
US 2020/0177061 A1    Jun. 4, 2020

Related U.S. Application Data

(62) Division of application No. 15/816,695, filed on Nov. 17, 2017, now Pat. No. 10,601,288.

(51) Int. Cl.
*H02K 1/10*    (2006.01)
*H02K 15/00*    (2006.01)
(Continued)

(52) U.S. Cl.
CPC .......... *H02K 15/0012* (2013.01); *H02K 3/16* (2013.01); *H02K 3/20* (2013.01); *H02K 15/0068* (2013.01);
(Continued)

(58) Field of Classification Search
CPC .......... H02K 3/20; H02K 3/16; H02K 17/165; H02K 15/0012; H02K 15/0068; H02K 15/064; H02K 1/223; H02K 21/46
See application file for complete search history.

(56) References Cited

U.S. PATENT DOCUMENTS

| 3,246,188 A | 4/1966 | McGarvey et al. |
| 3,870,912 A | 3/1975 | Kipke et al. |
| (Continued) | | |

FOREIGN PATENT DOCUMENTS

| DE | 1015122 | 9/1957 |
| JP | H09117119 | 5/1997 |
| WO | 2015112891 | 7/2015 |

OTHER PUBLICATIONS

European Patent Office, European Search Report dated Mar. 28, 2019 in Application No. 18206977.3.
(Continued)

*Primary Examiner* — Thanh Lam
(74) *Attorney, Agent, or Firm* — Snell & Wilmer L.L.P.

(57) ABSTRACT

A method of manufacturing a rotor of an electric motor or an electric generator includes positioning a plurality of amortisseur bars and using additive manufacturing to place electrically conductive material. More specifically, positioning the amortisseur bars may include circumferentially positioning the bars around a rotor stack and using additive manufacturing to place electrically conductive material may include forming a non-solid pattern of electrically conductive material, such as a pattern of electrically conductive traces, across opposite axial ends of the rotor stack to electrically interconnect an amortisseur circuit.

12 Claims, 6 Drawing Sheets

(51) Int. Cl.
*H02K 3/16* (2006.01)
*H02K 15/06* (2006.01)
*H02K 3/20* (2006.01)
H02K 1/22 (2006.01)
H02K 17/16 (2006.01)
H02K 21/46 (2006.01)

(52) U.S. Cl.
CPC ........... *H02K 15/064* (2013.01); *H02K 1/223* (2013.01); *H02K 17/165* (2013.01); *H02K 21/46* (2013.01)

(56) References Cited

U.S. PATENT DOCUMENTS

| | | | | |
|---|---|---|---|---|
| 4,064,410 | A * | 12/1977 | Roach | H02K 15/0012 310/211 |
| 4,309,635 | A | 1/1982 | Sei | |
| 4,453,101 | A | 6/1984 | Nelson | |
| 5,422,527 | A * | 6/1995 | Lazzaro | H02K 5/128 310/211 |
| 6,765,322 | B2 | 7/2004 | Young | |
| 8,193,680 | B2 * | 6/2012 | Fukuda | H02K 15/0012 310/211 |
| 8,274,190 | B2 * | 9/2012 | Alexander | H02K 15/0012 310/211 |
| 8,720,041 | B2 | 5/2014 | Meyer | |
| 8,925,182 | B2 | 1/2015 | Wang | |
| 8,994,242 | B2 | 3/2015 | Kleber | |
| 9,455,604 | B2 | 9/2016 | Rasmussen | |
| 2006/0273683 | A1 * | 12/2006 | Caprio | H02K 17/165 310/211 |
| 2007/0075603 | A1 | 4/2007 | Whiddon | |
| 2015/0076951 | A1 | 3/2015 | Lynch et al. | |

OTHER PUBLICATIONS

USPTO, Election/Restriction Requirement dated Sep. 18, 2019 in U.S. Appl. No. 15/816,695.

USPTO, Notice of Allowance dated Jan. 2, 2020 in U.S. Appl. No. 15/816,695.

* cited by examiner

ADDITIVE AMORTISSEUR CIRCUIT

CROSS REFERENCE TO RELATED APPLICATION

This application is a divisional of, claims priority to and the benefit of, U.S. Ser. No. 15/816,695 filed on Nov. 17, 2017 and entitled "ADDITIVE AMORTISSEUR CIRCUIT," which is hereby incorporated by reference in its entirety for all purposes.

FIELD

The present disclosure relates to electric motors or electric generators, and more specifically, to amortisseur circuits of rotors.

BACKGROUND

Most conventional electric motors and/or electric generators have a rotor made of separate planar members of ferromagnetic material that are held together by a binder, such as an epoxy. Rotors also generally include a plurality of amortisseur bars that extend along the rotor stack between opposite axial ends of the rotor stack. Conventional rotors further include end laminations that help to hold the rotor stack together and that, together with the amortisseur bars, form an amortisseur circuit. Conventional end laminations are often brazed to the opposite ends of the rotor stack. Brazing generally involves introducing heat to the rotor stack assembly, and this heat may lead to localized hotspots that may degrade the mechanical properties of the rotor stack. Additionally braze filler material may flow into undesired areas of the rotor stack, or binders/adhesives of the rotor stack may volatize, further degrading the structural integrity of the rotor stack. Still further, end laminations are often heavy and may add excessive weight to the electric motor.

SUMMARY

In various embodiments, the present disclosure provides a method of manufacturing a rotor for an electric motor or an electric generator. The method may include positioning a plurality of amortisseur bars circumferentially around a rotor stack, wherein the plurality of amortisseur bars extend between a first axial end of the rotor stack and a second axial end of the rotor stack opposite the first axial end. The method may also include additively manufacturing electrically conductive material on the first axial end and the second axial end of the rotor stack and electrically interconnecting the plurality of amortisseur bars together via the electrically conductive material to form an amortisseur circuit.

In various embodiments, the step of positioning the plurality of amortisseur bars is performed before additively manufacturing the electrically conductive material. In various embodiments, positioning the plurality of amortisseur bars is performed after additively manufacturing the electrically conductive material. In various embodiments, positioning the plurality of amortisseur bars includes additively manufacturing the amortisseur bars.

In various embodiments, additively manufacturing the electrically conductive material includes forming a pattern of electrically conductive traces. In various embodiments, the pattern includes a plurality of radially extending traces. In various embodiments, the pattern includes a mesh-like formation of electrically conductive traces.

Also disclosed herein, according to various embodiments, is a rotor of an electric motor or an electric generator. The rotor may include a rotor stack having a central longitudinal axis, a first axial end, and a second axial end opposite the first axial end. The rotor may include a plurality of amortisseur bars circumferentially distributed around and radially outward of the central longitudinal axis of the rotor stack. The plurality of amortisseur bars may extend substantially parallel to the central longitudinal axis between the first axial end and the second axial end. The rotor may further include a first layer of electrically conductive material on the first axial end of the rotor stack and a second layer of electrically conductive material on the second axial end of the rotor stack. In various embodiments, the first layer and the second layer each includes a non-solid pattern of electrically conductive traces.

In various embodiments, any cross-section, perpendicular to the central longitudinal axis, of the first layer and the second layer defines at least one gap. The at least one gap may be radially positioned between adjacent amortisseur bars of the plurality of amortisseur bars. In various embodiments, the non-solid pattern of electrically conductive traces comprises a plurality of radially extending traces. In various embodiments, the non-solid pattern of electrically conductive traces comprises a mesh-like formation of electrically conductive traces. In various embodiments, the first axial end and the second axial end are free of electrically conductive lamination layers. Also disclosed herein, according to various embodiments, is an electric motor that includes a stator and the rotor as described above.

The foregoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Figure 1:
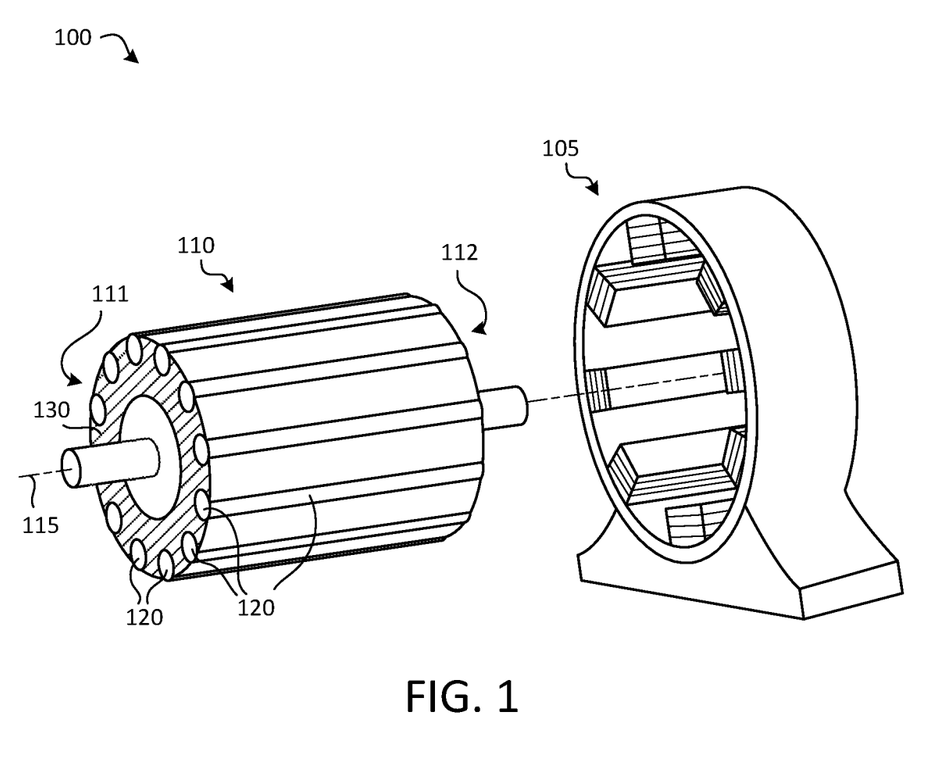
FIG. 1 is a perspective view of an electric machine, such as an electric motor or an electric generator, in accordance with various embodiments.

In various embodiments, and with reference to FIG. 1, an electric machine 100, such as an electric motor or an electric generator, having an additively manufactured amortisseur circuit is disclosed herein. The electric machine 100 generally includes a stator 105 and a rotor 110. The amortisseur circuit includes a plurality of amortisseur bars 120 extending along a rotor 110 and an electrically conductive material 130 formed, via additive manufacturing techniques, on opposite ends of the rotor stack. Although the electrically conductive material 130 is represented as parallel hatching in FIG. 1, the electrically conductive material 130, as described in greater detail below, generally refers to a non-solid pattern of material (e.g., not a lamination layer). Accordingly, the pattern of the electrically conductive material 130 formed on opposite ends of the rotor 110 is not limited to the hatching pattern shown in FIG. 1. Thus, the hatching pattern of FIG. 1 schematically represents the traces of electrically conductive material 130. In various embodiments, the electric machine 100 is an electric motor or an electric generator of an aircraft.

As used herein, and with continued reference to FIG. 1, the terms axial, radial, and circumferential are relative to the central longitudinal axis 115 of the rotor 110. That is, a first component that is "radially outward" of a second component means that the first component is positioned at a greater distance away from the central longitudinal axis 115 of the rotor 110 than the second component. Correspondingly, a first component that is "radially inward" of a second component means that the first component is positioned closer to axis 115 than the second component. Accordingly, in the case of the rotor 110, components that are radially inward of other components and that rotate circumferentially about the central longitudinal axis 115 rotates through a circumferentially shorter path than the other components. Similarly, the term "axial" generally refers to a position along the central longitudinal axis 115.

Figure 2A:
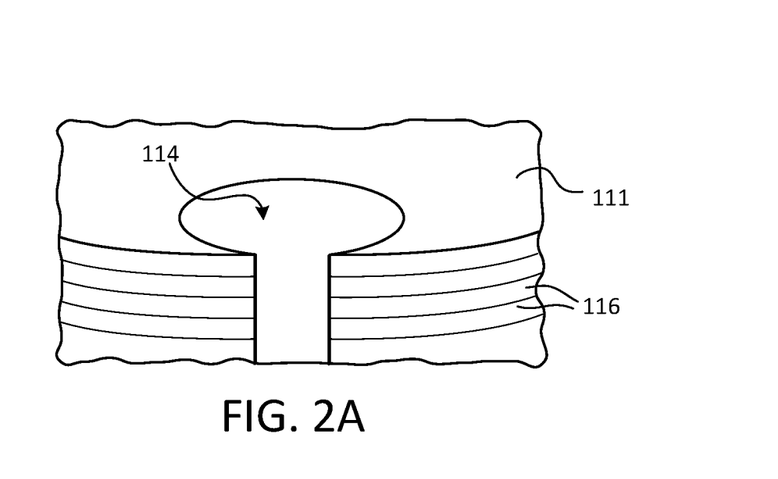
FIG. 2A is a perspective view of a channel defined in a rotor stack for an amortisseur bar, in accordance with various embodiments.
Figure 2B:
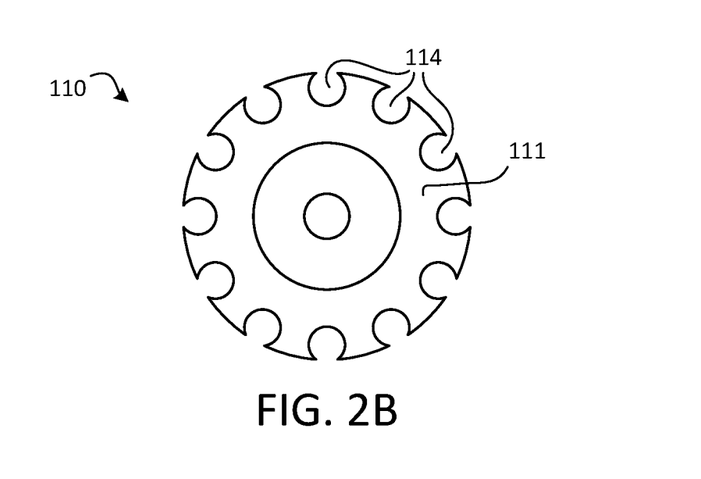
FIG. 2B is an end view of a rotor stack before amortisseur bars are provided, in accordance with various embodiments.

In various embodiments, and with reference to FIGS. 1, 2A, and 2B, the rotor 110, also referred to herein as "rotor stack" 110, includes a plurality of separate planar members of ferromagnetic material 116 that are held together by a binder or an adhesive. The rotor stack 110 may be made from iron or iron alloys, such as ferrosilicon, among other ferromagnetic materials. In various embodiments, and with reference to FIGS. 1, 3A, and 3B, rotor stack 110 also includes a plurality of amortisseur bars 120 that extend along the rotor stack 110 between opposite axial ends 111, 112 of the rotor stack. That is the rotor stack 110 may have a first axial end 111 and a second axial end 112 opposite the first axial end 111, and the amortisseur bars 120 may be configured to have opposite ends that are flush or substantially planar with the axial ends 111, 112 of the rotor stack 110.

In various embodiments, the amortisseur bars 120 are circumferentially distributed around central longitudinal axis 115 of the rotor 110. In various embodiments, the amortisseur bars 120 are radially outward of the central longitudinal axis 115 of the rotor 110 and may extend substantially parallel to the central longitudinal axis 115 (e.g., the amortisseur bars 120 may be skewed relative to the central longitudinal axis 115, but generally extend longitudinally between opposing ends of the rotor 110). The amortisseur bars 120 may be disposed within preformed channels 114 (with momentary reference to FIGS. 2A and 2B) of the rotor stack. The channels 114 may facilitate retention of the amortisseur bars 120 and may contributed to the mechanical strength of the electric machine 100. In various embodiments, the amortisseur bars may be only partially retained in channels, or the amortisseur bars may be entirely external to the rotor stack 110.

In various embodiments, and with reference to FIG. 1, the rotor 110 also includes an electrically conductive material 130 placed on the axial ends 111, 112 of the rotor stack 110 via additive manufacturing. Additional details pertaining to the method of forming the electrically conductive material 130 on the axial ends 111, 112 of the rotor stack 110 are included below with reference to FIG. 6. In various embodiments, electrically conductive material is deposited via additive manufacturing on both axial ends 111, 112 of the rotor stack. For example, a first layer of electrically conductive material may be disposed/placed/formed on the first axial end 111 of the rotor stack 110 and a second layer of electrically conductive material may be disposed/placed/formed on the second axial end 112 of the rotor stack. In various embodiments, the electrically conductive material (e.g., the first and second layers of electrically conductive material) forms a non-solid pattern of electrically conductive traces. Said differently, any cross-section, perpendicular to the central longitudinal axis 115 of the rotor stack 110, of the electrically conductive material (e.g., the first and second layers of electrically conductive material) defines at least one gap. That is, the electrically conductive material 130 is not a solid plate of material and is not a lamination layer at opposite axial ends of the rotor stack 110. Thus, the axial ends 111, 112 of the rotor 110 may be free of electrically conductive lamination layers. Utilizing additive manufacturing to apply a plurality of electrically conductive traces across the axial ends 111, 112 of the rotor 110 decreases manufacturing costs, compared with using conventional end lamination plates.

Figure 3A:
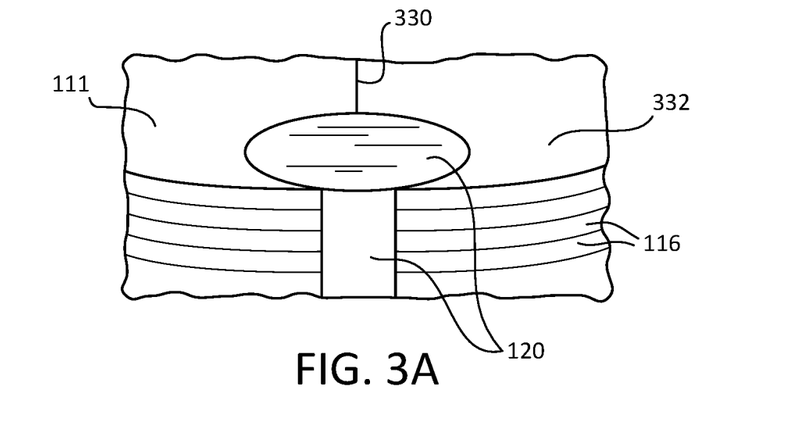
FIG. 3A is a perspective view of an amortisseur bar of a rotor stack and an additively manufactured conductive material disposed on an end of the rotor stack, in accordance with various embodiments.
Figure 3B:
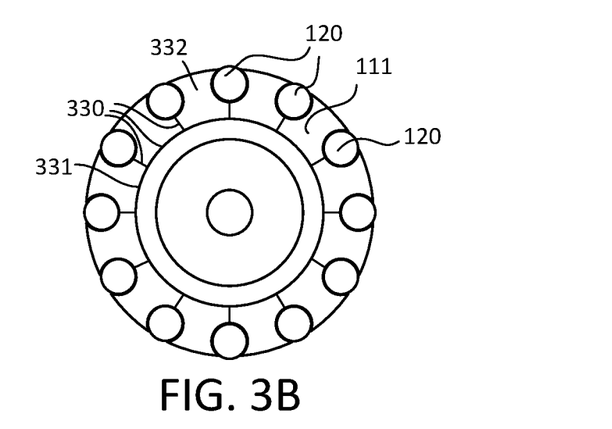
FIG. 3B is an end view of a rotor stack showing a pattern of additively manufactured conductive material, in accordance with various embodiments.

In various embodiments, and with reference to FIGS. 3A and 3B, the non-solid pattern of the electrically conductive material disposed on the axial ends 111, 112 of the rotor stack 110 is a plurality of radially extending, electrically conductive traces 330. In various embodiments, gaps 332 may be formed between adjacent electrically conductive traces 330. The gaps 332 defined in the electrically conductive layer by the electrically conductive traces 330 may at least be radially positioned between adjacent amortisseur bars 120. In various embodiments, the non-solid pattern of electrically conductive material includes a ring 331 disposed radially inward of the amortisseur bars 120, and the radially extending, electrically conductive traces 330 extend between the amortisseur bars 120 and the ring 331.

Figure 4A:
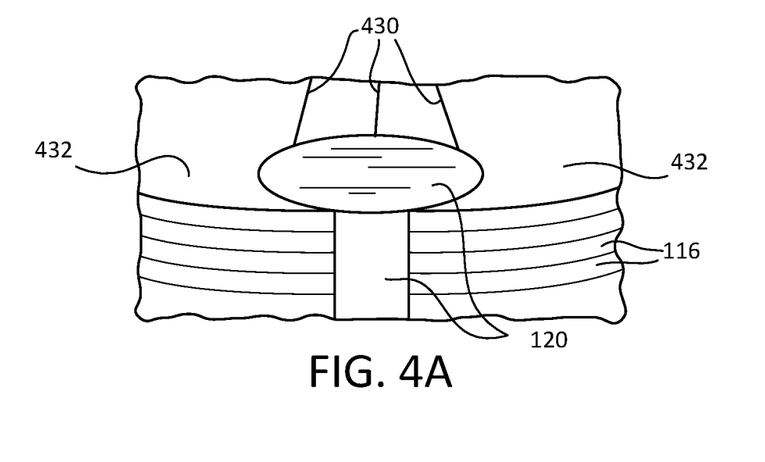
FIG. 4A is a perspective view of an amortisseur bar of a rotor stack and an additively manufactured conductive material disposed on an end of the rotor stack, in accordance with various embodiments.
Figure 4B:
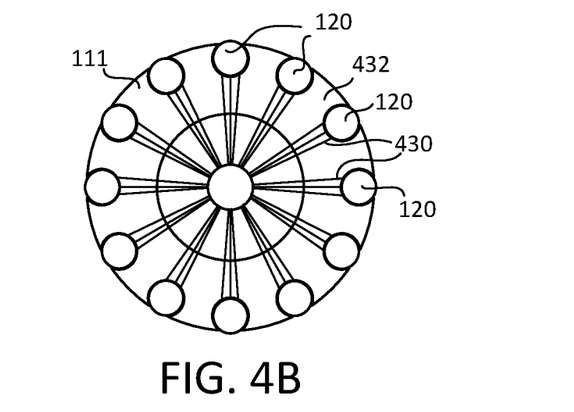
FIG. 4B is an end view of a rotor stack showing a pattern of additively manufactured conductive material, in accordance with various embodiments.

In various embodiments, and with reference to FIGS. 4A and 4B, the non-solid pattern of the electrically conductive material disposed on the axial ends 111, 112 of the rotor stack 110 is a plurality of radially extending traces 430. In various embodiments, gaps 432 may be formed between circumferentially adjacent traces 430. In various embodiments, a plurality of radially extending traces 430 may extend to each amortisseur bar 120 such that one or more gaps 432 are defined between circumferentially adjacent, radially extending traces 430 that extend to each amortisseur bar 120.

Figure 5A:
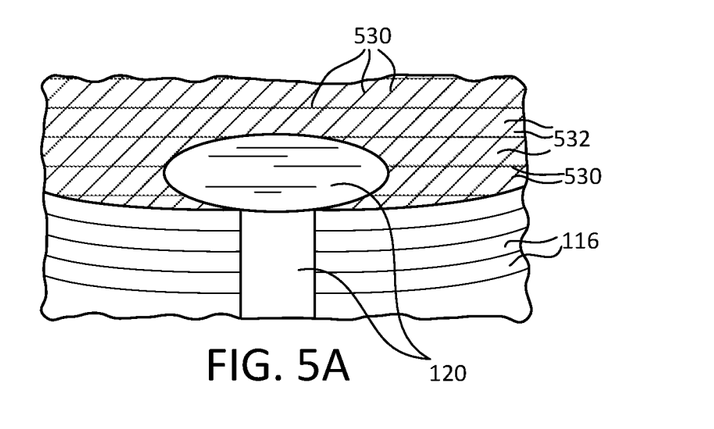
FIG. 5A is a perspective view of an amortisseur bar of a rotor stack and an additively manufactured conductive material disposed on an end of the rotor stack, in accordance with various embodiments.
Figure 5B:
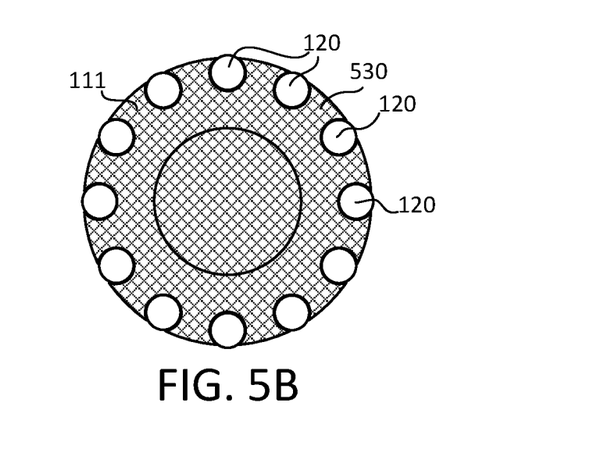
FIG. 5B is an end view of a rotor stack showing a pattern of additively manufactured conductive material, in accordance with various embodiments.

In various embodiments, and with reference to FIGS. 5A and 5B, the non-solid pattern of the electrically conductive material disposed on the axial ends 111, 112 of the rotor stack 110 is a mesh-like formation of electrically conductive traces 530. In various embodiments, gaps 532 may be formed between the traces 530. As mentioned above, the gaps 532 defined in the electrically conductive layer by the electrically conductive traces 530 may at least be radially positioned between adjacent amortisseur bars 120. In various embodiments, the electrically conductive material may include other patterns of traces, such as star-shaped or otherwise.

In various embodiments, the traces 430, 530 of electrically conductive material may not completely cover the axial ends of the amortisseur bars 120, but instead may terminate in electrical connection with the amortisseur bars 120, as shown in FIGS. 4A, 4B, 5A, and 5B. In various embodiments, the non-solid pattern of electrically conductive material extends over the axial ends of the amortisseur bars 120. In various embodiments, the electrically conductive material includes copper, copper alloy, aluminum, aluminum alloys, nickel, nickel based alloys, titanium-based materials, or electrically conductive carbon materials, among others.

In various embodiments, forming a non-solid pattern of electrically conductive material 130 on opposite axial ends 111, 112 of the rotor stack 110 via additive manufacturing provides various benefits over solid end-plate brazing techniques. The non-solid pattern of electrically conductive material 130, such as the pattern formed by traces 430 and traces 530, enables the amortisseur circuit to be completed while reducing the amount and weight of material used, according to various embodiments. Further, the rotation dynamics of the rotor 110 may be tuned, at least to a degree, using different patterns of traces, according to various embodiments. Still further, forming the non-solid pattern of electrically conductive material via additive manufacturing does not expose the rotor stack 110 to excessive temperatures and thus the rotor stack 110 does not experience localized hot spots, as would otherwise occur if conventional sold end-plate brazing techniques were employed, according to various embodiments.

Figure 6:
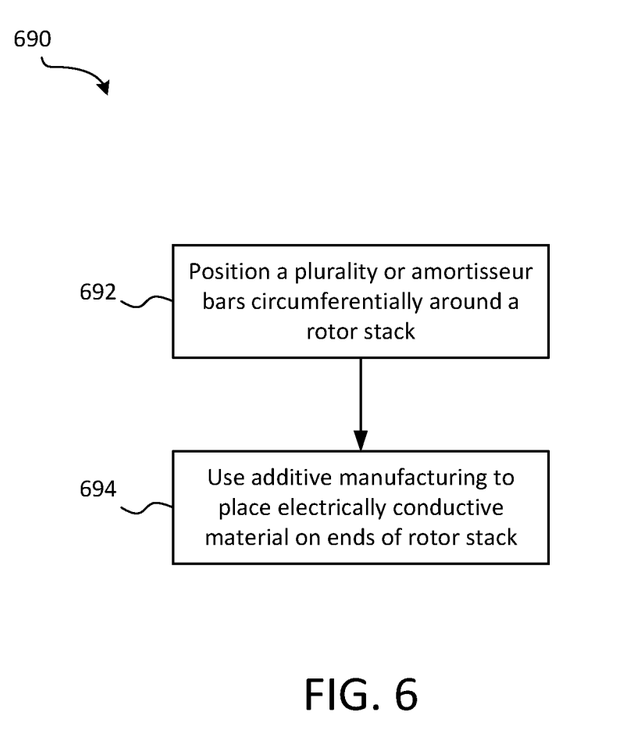
FIG. 6 is a schematic flow chart diagram of a method of manufacturing a rotor stack, in accordance with various embodiments.

In various embodiments, and with reference to FIG. 6, a method 690 of manufacturing a rotor 110 for an electric machine 100, such as an electric motor or an electric generator, is provided. The method 690 may include positioning a plurality of amortisseur bars 120 circumferentially around a rotor stack 110 at step 692 and using additive manufacturing to place electrically conductive material 130 on axial ends 111, 112 of the rotor stack 110 at step 694. In various embodiments, the steps 692, 694 of the method 690 electrically interconnect an amortisseur circuit that includes the plurality of amortisseur bars 120 and the electrically conductive material 130. In various embodiments, the phrase "using additive manufacturing" refers to incremental material deposition. In various embodiments, step 694 includes a high velocity oxy fuel ("HVOF") procedure, a micro-HVOF procedure, plasma arc deposition, or directed energy deposition additive manufacturing, among other technologies.

In various embodiments, step 692 is performed before step 694. That is, the amortisseur bars 120 may be in place within channels 114 of a rotor stack 110 or disposed external to the rotor stack 110 before using additive manufacturing to form the non-solid pattern of electrically conductive material. In various embodiments, step 692 is performed after step 694. That is, the electrically conductive material may be first formed on opposite axial ends 111, 112 of the rotor stack 110 before positioning the amortisseur bars 120 within channels 114 or otherwise placing the amortisseur bars 120. In various embodiments, step 692 is performed using additive manufacturing. That is, the amortisseur bars 120 themselves may be formed via additive manufacturing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotor of an electric motor or an electric generator, the rotor comprising:
   a rotor stack comprising a central longitudinal axis, a first axial end, and a second axial end opposite the first axial end;
   a plurality of amortisseur bars circumferentially distributed around and radially outward of the central longitudinal axis of the rotor stack, wherein the plurality of amortisseur bars extend between the first axial end and the second axial end; and
   a first layer of electrically conductive material on the first axial end of the rotor stack;
   a second layer of electrically conductive material on the second axial end of the rotor stack;
   wherein the first layer of electrically conductive material and the second layer of electrically conductive material each comprises a non-solid pattern of electrically conductive traces.

2. The rotor of claim 1, wherein any cross-section, perpendicular to the central longitudinal axis, of the first layer of electrically conductive material and the second layer of electrically conductive material defines at least one gap.

3. The rotor of claim 2, wherein the at least one gap is radially positioned between adjacent amortisseur bars of the plurality of amortisseur bars.

4. The rotor of claim 1, wherein the non-solid pattern of electrically conductive traces comprises a plurality of radially extending traces.

5. The rotor of claim 1, wherein the non-solid pattern of electrically conductive traces comprises a mesh-like formation of electrically conductive traces.

6. The rotor of claim 1, wherein the first axial end and the second axial end are free of electrically conductive lamination layers.

7. An electric motor comprising:
   a stator; and
   a rotor, wherein the rotor comprises:
      a rotor stack comprising a first axial end and a second axial end;
      a plurality of amortisseur bars circumferentially distributed around the rotor stack;
      a first layer of electrically conductive material on the first axial end of the rotor stack; and
      a second layer of electrically conductive material on the second axial end of the rotor stack;
      wherein the first layer of electrically conductive material and the second layer of electrically conductive material each comprises a non-solid pattern of electrically conductive traces.

8. The electric motor of claim 7, wherein the rotor stack comprises a central longitudinal axis, wherein any cross-section, perpendicular to the central longitudinal axis, of the first layer and the second layer of electrically conductive material defines at least one gap.

9. The electric motor of claim 8, wherein the at least one gap is radially positioned to be between adjacent amortisseur bars of the plurality of amortisseur bars.

10. The electric motor of claim 7, wherein the non-solid pattern of electrically conductive traces comprises a plurality of radially extending traces.

11. The electric motor of claim 7, wherein the non-solid pattern of electrically conductive traces comprises a mesh-like formation of electrically conductive traces.

12. The electric motor of claim 7, wherein the first axial end and the second axial end are free of electrically conductive lamination layers.

* * * * *